(12) United States Patent
Rosenfeld et al.

(10) Patent No.: US 8,593,347 B2
(45) Date of Patent: Nov. 26, 2013

(54) GNSS NAVIGATION AIDED BY STATIC DATA

(75) Inventors: Dvir Rosenfeld, Tel Aviv (IL); Boaz Efroni Rotman, Netanya (IL)

(73) Assignee: Cellguide Ltd., Rehovot (IL)

( * ) Notice: Subject to any disclaimer, the term of this patent is extended or adjusted under 35 U.S.C. 154(b) by 261 days.

(21) Appl. No.: 13/069,417

(22) Filed: Mar. 23, 2011

(65) Prior Publication Data

US 2011/0234455 A1 Sep. 29, 2011

Related U.S. Application Data

(60) Provisional application No. 61/317,308, filed on Mar. 25, 2010.

(51) Int. Cl.
  *G01S 19/37* (2010.01)
  *G01S 19/36* (2010.01)

(52) U.S. Cl.
  USPC .............................. 342/357.77; 342/357.76

(58) Field of Classification Search
  USPC ............. 342/357.21, 357.25, 357.46, 357.76, 342/357.77; 701/468, 469
  See application file for complete search history.

(56) References Cited

U.S. PATENT DOCUMENTS

| | | | |
|---|---|---|---|
| 7,071,853 B2 | 7/2006 | Price | |
| 7,664,764 B2 | 2/2010 | Biacs | |
| 7,788,025 B2 | 8/2010 | McLaren | |
| 7,979,203 B2 | 7/2011 | Haag | |
| 8,174,437 B2 * | 5/2012 | Whitehead | 342/357.24 |
| 2002/0161522 A1 * | 10/2002 | Cohen et al. | 701/213 |
| 2007/0061334 A1 | 3/2007 | Ramer | |
| 2009/0171583 A1 * | 7/2009 | DiEsposti | 701/213 |
| 2009/0210156 A1 | 8/2009 | Riley | |
| 2010/0061626 A1 | 3/2010 | Ben-Moshe | |

* cited by examiner

*Primary Examiner* — Dao Phan
(74) *Attorney, Agent, or Firm* — Mark M. Friedman

(57) ABSTRACT

A GNSS receiver includes a RF front end for receiving GNSS ranging signals, a navigation processor for calculating location from the ranging signals, and a repository of static data. The navigation processor includes the static data in the location calculation. Examples of static data include a digital elevation map, coordinates of tunnel entrances for use when the receiver resumes reception of the signals upon exiting a tunnel, and descriptions of structures in sufficient detail to enable multipath mitigation.

10 Claims, 1 Drawing Sheet

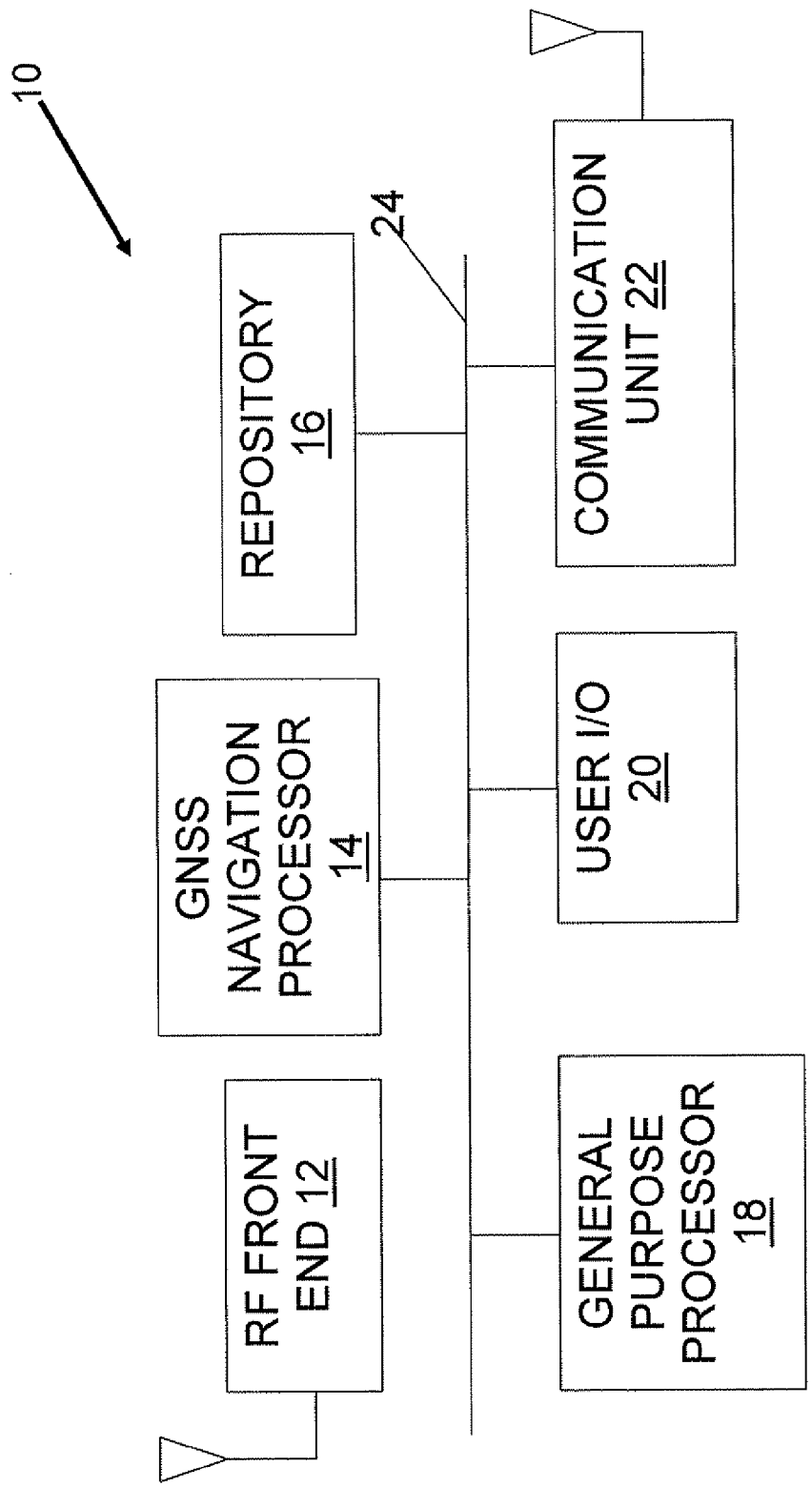

GNSS NAVIGATION AIDED BY STATIC DATA

This patent application claims priority from U.S. Provisional Patent Application No. 61/317,308, filed Mar. 25, 2010

FIELD AND BACKGROUND OF THE INVENTION

The present invention relates to GNSS (Global Navigation Satellite System) navigation and, more particularly, to GNSS navigation assisted by static data.

A GNSS system is a space-based global navigation system in which the satellites of a constellation of satellites in orbit around the Earth transmit signals that are used by terrestrial receivers for purposes such as navigation. Such signals are called "ranging signals" herein. The existing GNSS systems include the GPS system operated by the United States of America and the GLONASS system operated by Russia. Forthcoming GNSS systems include the European Galileo system and the Chinese Compass navigation system.

The operation of the GPS system now will be described as exemplary of how GNSS systems in general operate. The GPS system includes between 24 and 32 satellites in medium Earth orbit. The GPS ranging code that is available for public use is the C/A code which is a PseudoRandom binary Code (PRN) of 1,023 bits. Each satellite continuously transmits its own unique PRN code that is orthogonal to all the other PRN codes. Modulated on top of each satellite's C/A code is a navigation message that includes an ephemeris (plural: ephemerides) that describes the satellite's orbit. The ephemerides are updated every two hours.

A GPS receiver generates its own copies of the C/A codes, nominally synchronized with the satellite transmissions. When the receiver receives the C/A codes of the currently visible satellites (typically 12-16 satellites in open terrain), the receiver cross-correlates its copies of the C/A code with the received C/A codes to determine the one-way travel times from the satellites to the receiver. Knowing the ephemerides, the receiver computes the locations of the satellites at the times of the transmissions to obtain ranges to the satellites. If the receiver's clock were perfectly synchronized with the satellites then signals from three satellites would suffice to triangulate the position (horizontal coordinates x and y and elevation z) of the receiver. Because clocks that could be synchronized that well with the atomic clocks used by the satellites are far too expensive for routine use, signals from four or more satellites are used to determine x, y, z and the time offset dt of the receiver's clock from the GPS clocks. If signals from only three satellites are available for navigation, it is possible to use an estimate of z for calculating x, y and dt. The accuracy of the calculated x and y depends on the accuracy of the estimate of z.

The use of external data resources is a common practice in modern GNSS receivers. External data sources typically include a network server providing data that helps a satellite navigation receiver to achieve better performance. By using external aiding sources, a satellite navigation receiver may achieve improved sensitivity or shorter time to first fix (TTFF). Aiding data may include the user's approximate location, current time and satellite navigation messages that contain ephemeris and almanac data.

SUMMARY OF THE INVENTION

The present invention uses static data stored in a repository to assist a satellite navigation receiver. The navigation receiver may use data from this repository to improve its performance in terms of accuracy, sensitivity and TTFF. Aiding data in the repository may include, for example, a Digital Elevation Map (DEM), coordinates of tunnel entrances, and three-dimensional models of buildings in urban areas.

The present invention is not limited to a single type of aiding data and may exploit several types of aiding data. For example, data from a DEM may be combined with three-dimensional structure models to generate aiding data for a GNSS receiver.

Additionally, the static repositories used may be updated in a timely fashion. Updates may be performed on a scheduled basis, by a request from the device containing the repository or by the authority that generates the data in the repository.

Therefore, according to the present invention there is provided a Global Navigation Satellite System (GNSS) receiver including: (a) a radio frequency front end for receiving ranging signals from satellites of a GNSS constellation; (b) a navigation processor for calculating a location of the GNSS receiver from the ranging signals; and (c) a repository of static data; wherein the navigation processor is operative to include at least a portion of the static data in the calculating of the location of the GNSS receiver.

Additionally, according to the present invention there is provided a navigation method including the steps of: (a) storing, in a Global Navigation Satellite System (GNSS) receiver that receives ranging signals from satellites of a GNSS constellation and calculates its location from the ranging signals, a database of static data; and (b) including at least a portion of the static data in the calculating of the location by the GNSS receiver.

A basic GNSS receiver of the present invention includes a radio frequency front end, a navigation processor and a repository of static data. The radio frequency front end is for receiving ranging signals from the satellites of a GNSS constellation. The navigation processor is for calculating the location of the GNSS receiver from the ranging signals. The navigation processor includes at least a portion of the static data in the calculating of the location of the GNSS receiver. In the present context, "static" data is data that is updated at a frequency of at most about once per month.

In one set of preferred embodiments, the static data include a digital elevation map, so that the navigation processor needs ranging signals from a minimum of only three satellites, rather than the usual minimum of four satellites, to calculate the location of the GNSS receiver.

In a second set of preferred embodiments, the static data include a tunnel database. The tunnel database includes coordinates of one or more entrances of one or more tunnels. If the radio frequency front end loses contact with the satellite constellation when the location of the GNSS receiver is within a predetermined range of an entrance of (one of) the tunnel(s) then, when the radio frequency front end resumes contact with the satellite constellation, the navigation processor uses the coordinates of (all) the entrance(s) of that tunnel in calculating a new location of the GNSS receiver.

In a third set of preferred embodiments, the static data include a structure database that includes, for each of one or more structures, a respective description of the structure in sufficient detail for the GNSS receiver to model the multipath reception of the ranging signals by the radio frequency front end that occurs when the GNSS receiver is within a respective multipath distance from that structure. (Note that this multipath distance is respective to a particular structure because how close the GNSS receiver needs to be to the structure for multipath to matter varies from structure to structure.) When the GNSS receiver is within the respective multipath distance of (one of) the structure(s) (e.g. according to a preliminary location calculation that ignores multipath effects), the navigation processor is operative to account for the multipath reception in calculating the location of the GNSS receiver.

Preferably, the GNSS receiver also includes a communication unit for receiving updates of the static data.

A basic navigation method of the present invention is for use by a GNSS receiver that receives ranging signals from the satellites of a GNSS constellation and calculates its location from those signals. A database of static data is stored in the GNSS receiver. The GNSS receiver includes at least a portion of the static data in its calculating of its location.

In one set of preferred embodiments, the static data include a digital elevation map that the GNSS receiver includes in its calculation of its location. Most preferably, the digital elevation map is a compressed digital elevation map and the GNSS receiver decompresses the relevant at least portion of the digital elevation map to provide one or more decompressed digital elevation that is/are used by the GNSS receiver to calculate its location.

In a second set of preferred embodiments, the static data include a tunnel database that includes coordinates of one or more entrances of one or more tunnels. If the GNSS receiver had lost contact with the satellite constellation when the location of the GNSS receiver was within a predetermined range of an entrance of (one of) the tunnel(s), then upon resuming contact with the satellite constellation, the GNSS receiver includes the coordinates of (all) the entrance(s) of that tunnel when calculating its new location.

In a third set of preferred embodiments, the static data include a structure database that includes, for each of one or more structures, a respective description of the structure in sufficient detail for the GNSS receiver to model multipath reception of the ranging signals by the GNSS receiver when the GNSS receiver is within a respective multipath distance of that structure. When the GNSS receiver is within the respective multipath distance of (one of) the structure(s) (e.g. according to a preliminary location calculation that ignores multipath effects) the GNSS receiver accounts for multipath reception in its calculation of its location.

BRIEF DESCRIPTION OF THE DRAWINGS

Various embodiments are herein described, by way of example only, with reference to the accompanying drawings, wherein:

The sole FIGURE is a high-level block diagram of a GNSS receiver.

DESCRIPTION OF THE PREFERRED EMBODIMENTS

The principles and operation of GNSS navigation according to the present invention may be better understood with reference to the drawings and the accompanying description.

Referring now to the drawings, the FIGURE is a high-level block diagram of an exemplary GNSS receiver 10 of the present invention. GNSS receiver 10 includes a RF (Radio Frequency) front end 12, a GNSS navigation processor 14, a repository 16, a general purpose processor 18, conventional user input and output devices represented collectively by reference numeral 20 and a communication unit 22. Components 14, 16, 18, 20 and 22 communicate with each other via a common bus 24.

RF front end 12 receives ranging signals from a GNSS constellation such as the GPS constellation. GNSS navigation processor 14 uses the ranging signals received by RF front end 12, in conjunction with static data stored in repository 16, to compute the location of GNSS receiver 10. Apart from the assistance provided by the data in repository 16 as described below, the operation of GNSS navigation processor is conventional and need not be described in detail because such conventional navigation methods are well-known in the art. Repository 16 is a non-volatile memory such as a flash memory.

General purpose processor 18 controls the overall operation of GNSS receiver 10. In alternative embodiments of a GNSS receiver, a central processing unit of GNSS navigation processor 14 may assume the functionality of general purpose processor 18 in addition to its duties as the central processing unit of GNSS navigation processor 14, so that such alternative embodiments do not need a separate general purpose processor 18.

User input and output devices 20 typically include conventional devices such as a keypad, a display screen and a data port such as a USB port for transferring GPS coordinates.

Communication unit 22 is for receiving data to be stored in repository 16, whenever these data are updated by the sources of such data and also optionally when GNSS receiver 10 is initially configured. In some embodiments, communication unit 22 is just a conventional cellular telephony transceiver.

The various components of GNSS receiver 10 may be implemented as hardware, firmware, software, or combinations thereof, as is known in the art. For example, GNSS navigation processor 14 often is a special-purpose GNSS digital signal processor.

Several examples of repository data of the present invention now will be described.

One application of repository aiding for satellite navigation according to the present invention uses a DEM to improve receiver accuracy. For example, the software component described in co-pending U.S. patent application Ser. No. 13/039,473 improves the accuracy and availability of satellite navigation in urban areas through the use of a high-resolution digital elevation map (DEM) with global coverage over urban areas. The high resolution DEM of U.S. Ser. No. 13/039,473 acts as an additional "beacon" or satellite in the navigation system. U.S. Ser. No. 13/039,473 is incorporated by reference for all purposes as if fully set forth herein.

The DEM of U.S. Ser. No. 13/039,473 is compressed. General purpose processor 18 decompresses the elevation data of the DEM as needed in support of the computation of the location of GNSS receiver 10 by GNSS navigation processor 14.

The additional beacon provided by a DEM such as the DEM of U.S. Ser. No. 13/039,473 enables:
True 3D navigation with three received satellites.
Improved navigation accuracy with four or more received satellites.

A DEM such as the DEM of U.S. Ser. No. 13/039,473 may be used to improve GNSS receiver performance for ground applications such as vehicular or pedestrian use.

GNSS navigation processor 14 uses elevation-aiding data as an additional input to the location calculation. This improves the accuracy of the location calculation, as the aiding data acts as an additional data source for the calculation algorithm.

Another application of repository aiding for satellite navigation according to the present invention uses tunnel exit coordinates to improve receiver performance when exiting tunnels.

Tunnels exist in various length and geometries, from a few tens of meters long to several kilometers long. GNSS receivers are usually designed to switch to re-acquisition mode when the signal from the GNSS constellation is lost for more than a few seconds. The accuracy and time to first fix (TTFF) in re-acquisition modes is a challenge in GNSS receiver design, as the designer need to trade-off the TTFF and first fix accuracy.

Using tunnel repository data including tunnel entry and exit coordinates, and also optionally (if GNSS receiver 10 or a larger system that includes GNSS receiver 10 also includes an inertial navigation device for backup) tunnel length and geometry, helps solving this problem as repository data may be passed as aiding data to GNSS navigation processor 14. For tunnels with multiple exits or entrances, GNSS navigation processor 14 may test several hypotheses using aiding data from the tunnel repository.

The following algorithm may be used in a GNSS receiver 10 that has tunnel exit coordinate data in repository 16:

1. During normal operation, signal is lost for a specified amount of time ($T_{Loss}$ seconds) and GNSS navigation processor 14 enters re-acquisition mode.
2. Upon entering re-acquisition mode, GNSS navigation processor 14 queries repository 16 for a tunnel entrance within a specified threshold range ($R_{TunnelThresh}$) from the last location at which a satellite signal was received.
3. In case a tunnel entrance is located within the specified threshold range, GNSS navigation processor 14 queries repository 16 for all other openings, if any (because the "tunnel" may be a cave or a parking garage), of that tunnel.
4. The receiver uses the tunnel opening coordinate data as reference locations for the re-acquisition mode in a manner similar to the use performed in acquisition modes for conventional assisted GPS. See for example: *A-GPS: Assisted GPS, GNSS, and SBAS*, Frank van Diggelen, 2009, Artech House, pp. 44-54.
5. GNSS navigation processor 14 uses multiple reference locations by performing multiple (serial or parallel) re-acquisition attempts (Repeating assisted GPS using different reference locations).

Another application of repository aiding for satellite navigation according to the present invention uses a reference database of three-dimensional structures to model multipath signal propagation.

Dense urban environments present some of the hardest challenges for modern GNSS receivers. The characteristics of these environments, also known as "urban canyons", generate negative effects on GNSS receiver performance. The largest sources of errors in such "urban canyons" are erroneous measurements (multipath errors) caused by satellite transmissions that are reflected from adjacent buildings and received by the GNSS device.

A 3-D structure model repository 16 as a source of aiding for GNSS navigation processor 14 may be used to create a multipath prediction model. GNSS navigation processor 14 uses predicted multipath data to improve multipath mitigation algorithms by cancelling predicted multipath effects. The 3-D structure model repository may also include partial information such as building location, building height, etc.

Cancellation of multipath effects is widely addressed in the literature of the art, for example in: *Understanding GPS: Principles and Applications* 2$^{nd}$ edition, 2006, Kaplan, Elliott D. and Hagerty, Christopher J. (Editors), pp. 281-285.

The following algorithm is an example of the multipath mitigation that GNSS navigation processor 14 with access to a 3-D structure repository 16 performs:

1. For the currently known location, calculate the GNSS satellites in view. This calculation is based on the currently known location, on current time, and on GNSS ephemeris and almanac data. Parameters returned for each satellite in view include its azimuth and elevation relative to the current location of GNSS receiver 10.
2. Query repository 16 for structures at a range of up to a predetermined threshold $R_{structure}$ from the currently known location.
3. For each of the structures found (structure index $S_{Idx}$), repeat the following steps:
   a. For each of the satellites "in view" (Satellite index $SV_{Idx}$) by GNSS receiver 10, repeat the following:
      i. If structure $S_{Idx}$ is in the line of sight between satellite $SV_{Idx}$ and the current receiver location, estimate Line Of Sight (LOS) losses:
         Estimate the attenuation of the satellite signal due to structure obstruction based on available data from repository 16 such as structure material and geometry.
      ii. If structure $S_{Idx}$ is not in the line of sight between satellite $SV_{Idx}$ and the current receiver location, estimate multipath return:
         Estimate the attenuation of the reflected satellite signal from the structure received by the receiver (compared to the LOS signal).
         Calculate the delay difference between the LOS signal and the reflected signal.
4. For each satellite $SV_{Idx}$ repeat:
   a. Calculate cumulative LOS losses by summing LOS losses for all structure results in step 3.
   b. For each multipath reflection calculated (each structure $S_{Idx}$), calculate the attenuation and delay referenced to the main echo (main echo attenuation calculated in sub-step 4a).
5. Mitigation:
   a. The GNSS receiver calculates correlation results around several predicted code delays (code phases).
   b. For each multipath reflection, subtract the relative attenuation value, at the calculated delay, from the correlation result.
6. Receiver processing: Following multipath mitigation (step 5), GNSS navigation processor 14 performs standard operation, estimating satellite pseudoranges based on the correlation result after performing the mitigation algorithm.

The above algorithm description can be translated into the following mathematical derivation:

The received signal per satellite can be modeled, in the case of a single multipath return, as $$r(t) = A_1 e^{j\phi_1} c(t-\tau_1) + A_2 e^{j\phi_2} c(t-\tau_2)$$

where
$A_1, A_2$—Amplitude, $\phi_1, \phi_2$—phases, $\tau_1, \tau_2$—code phases Using the database, the parameters $A_2, \phi_2, \tau_2$ of the echo can be estimated and then the echo term can be subtracted from the received signal to yield the LOS estimation $\tilde{r}(t)$, $$\tilde{r}(t) = r(t) - A_2 e^{j\phi_2} c(t-\tau_2)$$

This estimation and subtraction is effected for each multipath return that is expected according to the database.

The detailed description of multipath mitigation provided herein is not the only implementation possible. Specifically, implementations of multipath mitigation algorithms are possible even when only partial data is available from the 3-D building repository. Partial information may include building location, building height, etc. For example, if a building's location and dimensions are known but the material of the building walls is unknown then a default material is used.

While the invention has been described with respect to a limited number of embodiments, it will be appreciated that many variations, modifications and other applications of the invention may be made. Therefore, the claimed invention as recited in the claims that follow is not limited to the embodiments described herein.

What is claimed is:

1. A Global Navigation Satellite System (GNSS) receiver comprising:
   (a) a radio frequency front end for receiving ranging signals from satellites of a GNSS constellation;
   (b) a navigation processor for calculating a location of the GNSS receiver from said ranging signals; and
   (c) a repository of data selected from the group consisting of:
      (i) a digital elevation map,
      (ii) a tunnel database that includes coordinates of at least one entrance of at least one tunnel, and
      (iii) a structure database that includes, for each of at least one structure, a respective description of said each structure in sufficient detail to model multipath reception of said ranging signals by said radio frequency front end when the GNSS receiver is within a respective multipath distance of said each structure;
   wherein said navigation processor is operative to include at least a portion of said data in said calculating of said location of the GNSS receiver.

2. The GNSS receiver of claim 1, wherein said data include said digital elevation map, and wherein said navigation processor is operative to use said digital elevation map to calculate said location from said ranging signals received from a minimum of three said satellites.

3. The GNSS receiver of claim 1, wherein said data include said tunnel database, and wherein, if said radio frequency front end loses contact with said constellation when said location of the GNSS receiver is within a predetermined range of one of said at least one entrance of one of said at least one tunnel, said navigation processor is operative, upon resumption of contact with said constellation by said radio frequency front end, to use said coordinates of all said at least one entrance of said one tunnel in calculating a new said location of the GNSS receiver.

4. The GNSS receiver of claim 1, wherein said data include said structure database, and wherein, when the GNSS receiver is within said multipath distance of one of said at least one structure, said navigation processor is operative to account for said multipath reception in calculating said location of the GNSS receiver.

5. The GNSS receiver of claim 1, further comprising:
   (d) a communication unit for receiving updates of said data.

6. A navigation method comprising the steps of:
   (a) storing, in a Global Navigation Satellite System (GNSS) receiver that receives ranging signals from satellites of a GNSS constellation and calculates its location from said ranging signals, data selected from the group consisting of:
      (i) a digital elevation map,
      (ii) a tunnel database that includes coordinates of at least one entrance of at least one tunnel, and
      (iii) a structure database that includes, for each of at least one structure, a respective description of said each structure in sufficient detail to model multipath reception of said ranging signals by said GNSS receiver when said GNSS receiver is within a respective multipath distance of said each structure; and
   (b) including at least a portion of said data in said calculating of said location by said GNSS receiver.

7. The method of claim 6, wherein said data include said digital elevation map and wherein said GNSS receiver includes said digital elevation map when calculating said location in response to receiving said ranging signals from a minimum of three said satellites.

8. The method of claim 7, wherein said digital elevation map is compressed and wherein the method further includes the step of:
   (c) decompressing at least a portion of said digital elevation map to provide at least one decompressed digital elevation that is used in said calculating of said location.

9. The method of claim 6, wherein said data include said tunnel database, and wherein said GNSS receiver includes said coordinates of all said at least one entrance of one of said at least one tunnel when calculating a new said location upon resumption of contact with said constellation subsequent to having lost said contact with said constellation when said location was within a predetermined range of one of said at least one entrance of said one tunnel.

10. The method of claim 6, wherein said data include said structure database, and wherein said GNSS receiver accounts for said multipath reception in said calculating of said location when said GNSS receiver is within said respective multipath distance of one of said at least one structure.

* * * * *